United States Patent [19]

Elder

[11] Patent Number: 5,031,823
[45] Date of Patent: Jul. 16, 1991

[54] METHOD OF OBTAINING EFFECTIVE FAYING SURFACE CONTACT IN VACUUM BRAZING

[75] Inventor: Charles S. Elder, Bedford, Mass.

[73] Assignee: The Charles Stark Draper Laboratory, Inc., Cambridge, Mass.

[21] Appl. No.: 622,374

[22] Filed: Dec. 5, 1990

Related U.S. Application Data

[63] Continuation of Ser. No. 405,235, Sep. 11, 1989, abandoned.

[51] Int. Cl.$^5$ .......................... B23K 1/00; B23K 1/19; B23K 20/14
[52] U.S. Cl. ............................. 228/173.3; 228/173.6; 228/186; 228/237; 228/252; 228/243
[58] Field of Search .................. 228/193, 173.3, 173.6, 228/265, 186, 190, 221, 237, 243, 252; 29/463; 156/275.1, 286

[56] References Cited

U.S. PATENT DOCUMENTS

| | | | |
|---|---|---|---|
| 3,067,507 | 12/1962 | Titus | 228/221 |
| 3,091,846 | 6/1963 | Henry | 228/221 |
| 3,980,220 | 9/1976 | Wolfe et al. | 228/221 |
| 4,117,970 | 10/1978 | Hamilton et al. | 228/190 |
| 4,152,816 | 5/1979 | Ewing et al. | 228/186 |
| 4,869,422 | 9/1989 | Turner | 228/221 |
| 4,886,203 | 12/1989 | Puzrin et al. | 228/186 |

FOREIGN PATENT DOCUMENTS

| | | | |
|---|---|---|---|
| 1441122 | 6/1976 | United Kingdom | 228/221 |
| 2106016 | 4/1983 | United Kingdom | 228/221 |

OTHER PUBLICATIONS

Naval Ship Research and Development Center, Research and Development Report, L. F. Aprigliano and C. A. Zanis, #4177, Nov. 1973.
NASA Tech Briefs, "Furnace Brazing Under Partial Vacuum", vol. 4, No. 1, Spring 1979.

Primary Examiner—Samuel M. Heinrich
Attorney, Agent, or Firm—Joseph S. Iandiorio

[57] ABSTRACT

A method of obtaining effective faying in joining parts includes forming a first and second member into predetermined complementing shapes. The members are then placed together and sealed along a peripheral track to form a chamber between the members. The method further includes applying a pressure differential to the members with the lesser pressure residing in the chamber and heating the members to soften at least one of the members to conform the members to each other under the force of the differential pressure.

15 Claims, 2 Drawing Sheets

METHOD OF OBTAINING EFFECTIVE FAYING SURFACE CONTACT IN VACUUM BRAZING

This is a continuation of application Ser. No. 07/405,235, filed Sept. 11, 1989, now abandoned.

FIELD OF INVENTION

This invention relates to a method of joining parts, and more particularly to a method for obtaining effective faying of non-planar parts as well as a planar parts.

BACKGROUND OF INVENTION

Recently a technique has been used for forming curved members with integral channels. Initially, the channels are created in one of two flat plates. The plates are then vacuum brazed together over their confronting surfaces to form a composite plate. The composite plate is then formed, such as by hydroforming, into a curved shape.

Although this technique works fairly well there are some distortions in the channels due to the bending and forming. The thought occurred to the present inventor that the plates could first be formed into complementing curved shapes and then brazed or otherwise joined together. The necessary channels are formed by machining grooves in one of the plates after shaping, but before joining. The common wisdom taught, however, that vacuum brazing of curved parts was not practical because uniform contact across the adjacent surfaces was not achievable. Even spring loading techniques, used in joining flat plates, do not work well with curved plates and are often less than satisfactory in joining flat plates.

Other techniques for joining curved members include dip brazing, but that technique is not practical when these members have long or tortuous flux paths. Further, residual flux salts trapped between the members can cause a severe corrosion problem. Such problems prohibit the use of dip brazing to form composites that are used in high reliability military and space applications.

SUMMARY OF INVENTION

It is therefore an object of this invention to provide an improved method of efficiently faying parts.

It is a further object of this invention to provide such an improved method which produces uniform contact between the parts throughout their confronting surfaces.

It is a further object of this invention to provide such an improved method which is suitable for use with non-planar, curved and irregular shaped parts.

It is a further object of this invention to provide such an improved method which is suitable for use with parts having complex and tortuous flux gaps and which leaves no corrosive residue in the curved members.

It is a further object of this invention to provide such an improved method which avoids distortion of channels or features in the parts.

It is a further object of this invention to provide such an improved method which provides effective faying of curved, non-planar and irregular shaped parts.

This invention results from the realization that two parts can be effectively fayed by sealing the members together along a peripheral track to form a chamber between the members, applying a pressure differential to the members with the lesser pressure residing in the chamber, and heating the members to soften at least one of the members to conform the members to each other under the force of the differential pressure.

This invention features a method of obtaining effective faying in joining parts by forming a first and second member into predetermined complementary shapes. The members are then placed together and sealed along a peripheral track to form a chamber between the members. A pressure differential is applied to the members with the lesser pressure residing in the chamber. Heat is then applied to the members to soften at least one of the members to conform the members to each other under the force of the differential pressure. The members can be made from aluminum or steel which are nested together. The step of sealing can include welding or soldering the members together. The method of joining may further include the step of introducing a filler metal between the members before placing the members together. The filler material can be a brazing or solder material.

DISCLOSURE OF PREFERRED EMBODIMENT

Other objects, features will occur to those skilled in the art from the following description of the preferred embodiments and the accompanying drawings, in which.

The method of joining metal plates according to this invention may be accomplished by assembling a pair of plates. The plates can be made of aluminum, steel or other suitable metals, and can be flat or formed in complementary shapes using one of several methods including hydroforming and machining. The plates are thereafter sealed together by soldering or welding the plates along a peripheral track to form a chamber between the plates. Soldering is less likely because few metals deform under vacuum below 840° F., the maximum melting point of solders. The plates could also be sealed mechanically as with a metal gasket. This track is preferably disposed near or at the ends of the plate, but may be located anywhere between the plates. A vacuum pump is connected to the chamber for creating a reduced pressure within the chamber. The plates are then heated to soften at least one of the plates to conform the plates to each other under the force of the pressure differential and to bond the plates together.

Another method of joining metal plates, according to this invention, includes introducing a filler metal between the plates before they are sealed together. Preferably, if the plates are aluminum, this filler metal consists of an aluminum silicon alloy which can be purchased in thin foil or cladded to plain aluminum sheets to form what is called brazing sheet. More normally, brazing sheet, clad with filler metal, could constitute one of the plates. In the alternative, a solder material can be used as filler material. A reduced pressure is created within the chamber and the plates are heated to soften at least one plate to conform the plates to each other and to braze the plates together. The faying method of this invention is particularly effective for joining non-planar, curved or irregular shaped plates which nest or conform to one another as illustrated following.

Figure 1:
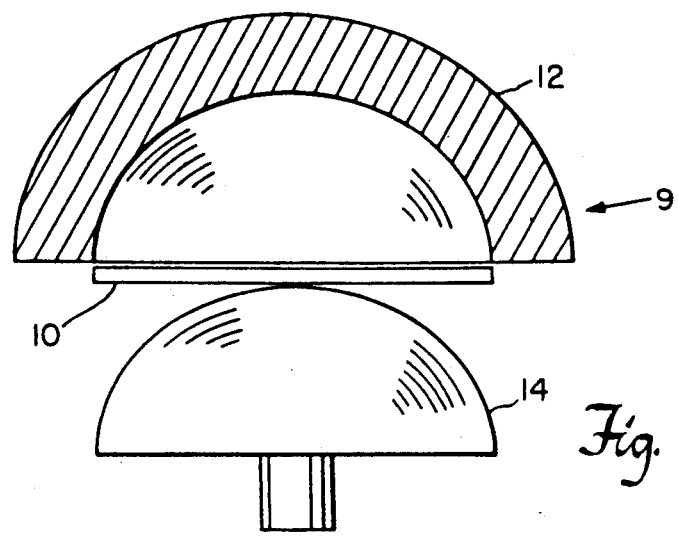
FIG. 1 illustrates a method for forming a convex member from a flat sheet of metal using a press.
Figure 2:
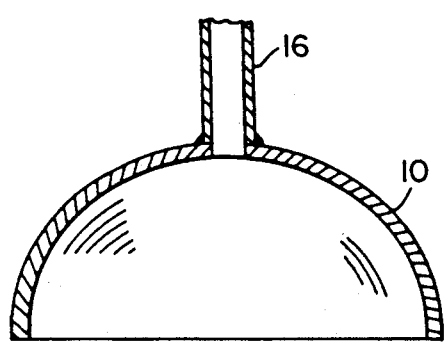
FIG. 2 is a side sectional view of a vacuum pipe welded to the convex member formed in FIG. 1.
Figure 3:
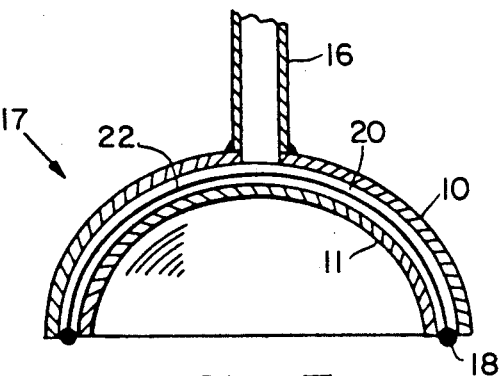
FIG. 3 is a side sectional view of two nested convex members welded together to form a chamber between them.

A preferred method of joining metal plates includes forming a first aluminum plate 10, FIG. 1, which is approximately one-quarter inch thick, into a convex shape by a press 9 having a female member 12 and a male member 14. A second aluminum plate 11, FIG. 3, which is preferably thinner than the first plate, is formed to have a slightly smaller convex shape to permit the plates to be nested. A tube 16, FIG. 2, which is preferably made of aluminum, is then welded to one of the member plates. In this embodiment, tube 16 is welded to the first aluminum plate 10 as shown, but may be welded to the concave portion of the second aluminum plate 11. Before nesting plates 10 and 11 together, a filler metal such as a brazing foil 22, made of an aluminum silicon, is disposed between the plates. The two convex shaped plates 10 and 11 are then nested as shown in FIG. 3, to form a composite 17. Plates 10 and 11 are then sealed together by a solder bead 18 which extends along a peripheral track between the ends of sheets 10 and 11. In the alternative, plates 10 and 11 can be welded together. By sealing plates 10 and 11 together in this manner, a chamber 20 is formed between the plates.

Figure 4:
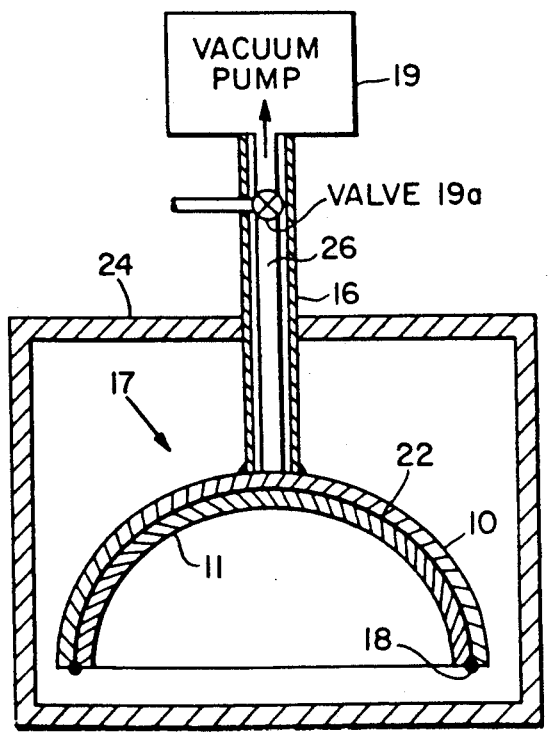
FIG. 4 is a side sectional view of the two nested members of FIG. 3 located within a furnace and disposed to have a negative pressure applied to the chamber during heating for conforming the convex members.

Composite 17 is then placed in a conventional furnace 24, FIG. 4, so that vacuum tube 16 extends outside the heat zone of furnace 24. A reduced pressure, such as $10^{-5}$ or $10^{-6}$ Torr is first applied to chamber 20 by a vacuum pump 19 via valve 19a and tube 16. A steel tube 26 is placed inside the aluminum tube 16 for at least that portion of the tube that is inside the heat zone to prevent the aluminum tube 16 from collapsing when composite 17 and tube 16 are pressurized and heated to brazing temperatures such as 1100° Fahrenheit. As the brazing temperature is approached, the differential pressure urges plates 10 and 11 together and bonds them by brazing using the filler metal on the brazing sheet or the foil present between them in the chamber.

The method of the present invention is not limited to joining convex shaped plates of metal. The method can be used for joining a variety of compatible plates such as nested box-shaped plates 10a, 11a, FIG. 5, or even flat plates 10b, 11b, FIG. 6.

Figure 5:
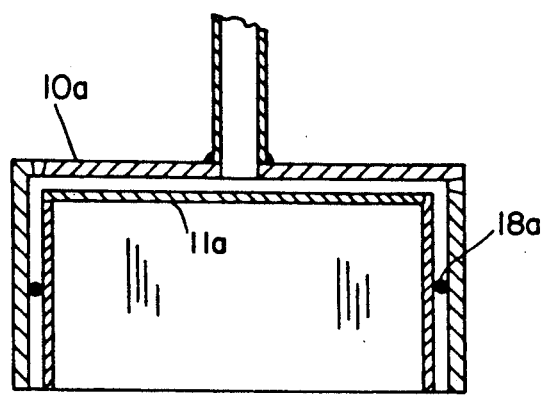
FIG. 5 is a side sectional view of one of numerous other shaped members which can be joined by the method of this invention.
Figure 6:
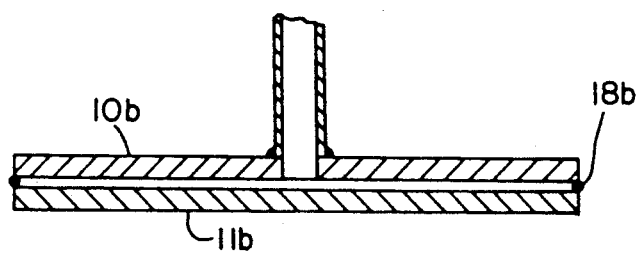
FIG. 6 is a side sectional view of unnested members which can be joined by the method of this invention.

Further, the present method is not limited to sealing the ends of the plates together. A peripheral seal track 18a can be placed anywhere between the plates, as shown in FIG. 5. The importance of the seal is to create a sealed chamber between the surfaces of the plates to be joined.

Figure 7A:
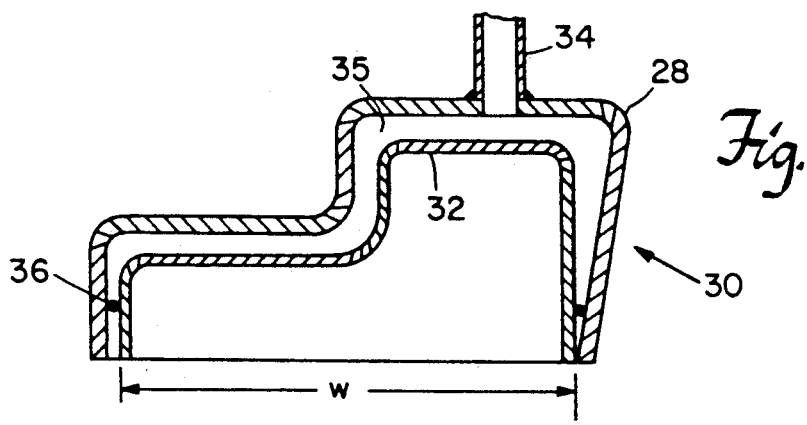
FIG. 7A is a side sectional view illustrating an initial step in joining two nested members where at least one of them has a reverse tapered section.
Figure 7B:
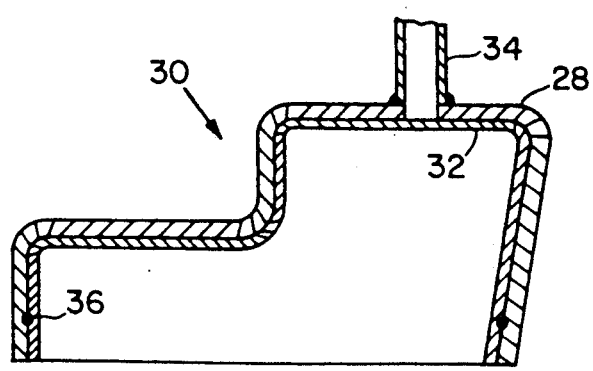
FIG. 7B is a view similar to FIG. 7A with the joining completed.

The method of the present invention can also be used to form a composite having a reverse taper portion. The method includes forming a first plate 28, FIG. 7A, having a reverse taper portion 30. Tube 34 is welded to plate 28, as shown. A second complementary plate 32 is then formed to have a width W which allows it to clear the opening formed by the ends of plate 28 when the plates are nested together. Plates 28 and 32 are then welded together along track 36 to form a chamber 35 as described above. The composite is then placed in a furnace and a reduced pressure is created within chamber 35 via tube 34. As the composite is heated, a uniform pressure across the faying surfaces is provided under the force of the differential pressure to produce the conforming contact between the faying surfaces as illustrated in FIG. 7B.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of obtaining effective faying in joining two parts comprising:
   introducing a filler metal between the two parts and then placing them together to be joined along confronting surfaces of said parts;
   sealing the parts along a peripheral track to form a chamber between the confronting surfaces of said parts;
   after sealing, establishing a below atmospheric pressure in the chamber;
   exposing the parts to an atmospheric pressure to establish a differential pressure between the chamber and outside surfaces of said parts; and
   heating the parts above the melting point of the filler metal and below the melting point of the two parts to be joined, to melt and flow said filler metal between the confronting surfaces to bond the surfaces together and to cause at least one of said parts to deform under the differential pressure to create intimate contact of said confronting surfaces for bonding.

2. The method of claim 1 in which said parts are non-planar.

3. The method of claim 1 in which said parts are convoluted in shape.

4. The method of claim 1 in which said step of sealing includes welding the parts together.

5. The method of claim 1 in which said step of sealing includes soldering the parts together.

6. The method of claim 1 in which said filler metal is brazing material.

7. The method of claim 1 in which said filler metal is soldering material.

8. The method of claim 1 in which one of said parts is formed into a predetermined shape and the other said part into a complementary shape before introducing filler metal between the parts and placing them together.

9. The method of claim 1 in which at least one of said parts includes a negative tapered portion.

10. The method of claim 1 in which the sealing of the parts is done under vacuum.

11. The method of claim 1 in which the parts are made from steel.

12. A method of obtaining effective faying in joining two members comprising:
   forming a first member into a predetermined shape;
   forming a second member into a complementary shape for nesting in the first member;

introducing a filler metal between said members and then nesting the members together to be joined along confronting surfaces of said members;

sealing the members along a peripheral track to form a chamber between the confronting surfaces of said members;

after sealing, establishing a below atmospheric pressure in the chamber;

exposing the members to an atmospheric pressure to establish a differential pressure between the chamber and outside surfaces of said members; and heating the members above the melting point of the filler metal and below the melting point of the two members to be joined, to melt and flow said filler metal between the confronting surfaces to bond the surfaces together and to cause at least one of said members to deform under the differential pressure to create intimate contact of said confronting surfaces for bonding.

13. A method of obtaining effective faying in joining two parts by brazing comprising:

introducing brazing material between the two parts and then placing them together to be joined along confronting surfaces of said parts;

sealing the parts along a peripheral track to form a chamber between the confronting surfaces of said parts;

after sealing, establishing a below atmospheric pressure in the chamber;

exposing the parts to an atmospheric pressure to establish a differential pressure between the chamber and outside surfaces of said parts; and heating the parts above the melting point of the brazing material and below the melting point of the two parts to be joined, to melt and flow said brazing material between the confronting surfaces to bond the surfaces together by brazing and to cause at least one of said parts to deform under the differential pressure to create intimate contact of said confronting surfaces for brazing.

14. A method of obtaining effective faying in joining two aluminum parts by brazing comprising:

introducing brazing material between the two aluminum parts and then placing them together to be joined along confronting surfaces of said parts;

sealing the parts along a peripheral track to form a chamber between the confronting surfaces of said parts;

after sealing, establishing a below atmospheric pressure in the chamber;

exposing the parts to an atmospheric pressure to establish a differential pressure between the chamber and outside surfaces of said parts; and heating the aluminum parts above the melting point of the brazing material and below the melting point of the two aluminum parts to be joined, to melt and flow said brazing material between the confronting surfaces to bond the surfaces together by brazing and to cause at least one of said parts to deform under the differential pressure to create intimate contact of said confronting surfaces for brazing.

15. The method of claim 14 in which said brazing material is aluminum silicon.

* * * * *